US011698340B2

(12) United States Patent
Dohi et al.

(10) Patent No.: US 11,698,340 B2
(45) Date of Patent: Jul. 11, 2023

(54) FIRE DETECTION APPARATUS

(71) Applicant: HOCHIKI Corporation, Shinagawa-ku (JP)

(72) Inventors: Manabu Dohi, Shinagawa-ku (JP); Tomohiko Shimadzu, Shinagawa-ku (JP); Keisuke Washizu, Shinagawa-ku (JP)

(73) Assignee: Hochiki Corporation, Tokyo (JP)

( * ) Notice: Subject to any disclaimer, the term of this patent is extended or adjusted under 35 U.S.C. 154(b) by 110 days.

(21) Appl. No.: 17/033,721

(22) Filed: Sep. 26, 2020

(65) Prior Publication Data

US 2021/0088442 A1    Mar. 25, 2021

Related U.S. Application Data

(63) Continuation-in-part of application No. PCT/JP2019/012774, filed on Mar. 26, 2019.

(30) Foreign Application Priority Data

Mar. 28, 2018    (JP) .................................. 2018-062683

(51) Int. Cl.
*G01N 21/53*    (2006.01)
(52) U.S. Cl.
CPC .................... *G01N 21/53* (2013.01)
(58) Field of Classification Search
CPC ............. G01N 21/53; H01M 10/052; H01M 10/0525; H01M 2004/027; H01M 4/0404;
(Continued)

(56) References Cited

U.S. PATENT DOCUMENTS 5,225,810 A * 7/1993 Inoue ..................... G01S 17/10
340/630
6,011,478 A    1/2000 Suzuki et al.
(Continued)

FOREIGN PATENT DOCUMENTS

CN    1987426 A    6/2007
CN    102171733 A    8/2011
(Continued)

OTHER PUBLICATIONS

Written Opinion of PCT/JP2019/012774.
(Continued)

*Primary Examiner* — Tri T Ton
(74) *Attorney, Agent, or Firm* — Blank Rome LLP

(57) ABSTRACT

A fire detection apparatus 1 includes a first light emitting unit 101 that irradiates a detection space located inside or outside the fire detection apparatus 1 with first detection light, a second light emitting unit 102 that irradiates the detection space with second detection light having a different wavelength from a wavelength of the first detection light, a light receiving unit 103 that receives scattered light of the first detection light irradiated from the first light emitting unit 101 due to smoke, outputs a first light receiving signal according to the received scattered light, receives scattered light of the second detection light irradiated from the second light emitting unit 102 with respect to smoke, and outputs a second light receiving signal according to the received scattered light, and an identification unit 107*a* that identifies a type of smoke present in the detection space on the basis of an output ratio of an output value of the first light receiving signal to an output value of the second light receiving signal output from the light receiving unit 103 and a rising rate of the output value of the first light receiving signal or the second light receiving signal.

7 Claims, 6 Drawing Sheets

(58) Field of Classification Search
CPC .. H01M 4/0435; H01M 4/134; H01M 4/1395; H01M 4/382; H01M 4/661; H01M 4/742; H01M 4/662; H01M 4/70; H04B 7/024; H04L 5/0023; H04L 5/0035; H04L 5/0048; H04L 5/0051; H04L 5/0053; H04L 5/0094; H04L 69/324; H04W 72/1289; H04W 76/27; Y02E 60/10; G08B 17/107; G08B 29/043; G08B 29/185
USPC .................................. 356/432–444, 335–343
See application file for complete search history.

(56) References Cited

U.S. PATENT DOCUMENTS

| | | | |
|---|---|---|---|
| 8,638,436 | B2 | 1/2014 | Dohi |
| 8,941,505 | B2 | 1/2015 | Dohi |
| 10,769,938 | B1 * | 9/2020 | Chen .................... G08B 29/145 |

FOREIGN PATENT DOCUMENTS

| | | |
|---|---|---|
| CN | 102498384 | 6/2012 |
| CN | 103366495 A | 10/2013 |
| CN | 103632484 A | 3/2014 |
| EP | 3 107 079 A1 | 12/2016 |
| JP | 6-314384 A | 11/1994 |
| JP | H11-23458 | 1/1999 |
| JP | 2001-283340 A | 10/2001 |
| JP | 2009-295036 A | 12/2009 |
| JP | 2011-123793 | 6/2011 |
| JP | 2013-235609 A | 11/2013 |
| JP | 2015-153058 A | 8/2015 |

OTHER PUBLICATIONS

International Search Report of International Application No. PCT/JP2019/012774.
Taiwan Office Action dated Dec. 5, 2022 in counterpart TW Application No. 108110810.

* cited by examiner

[Fig. 1]
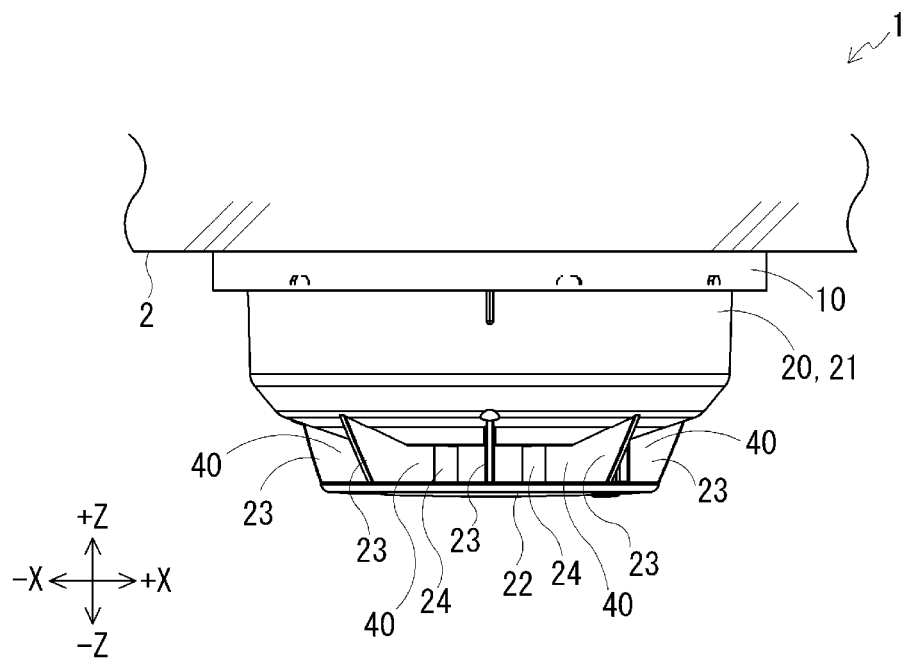
[Fig. 2]
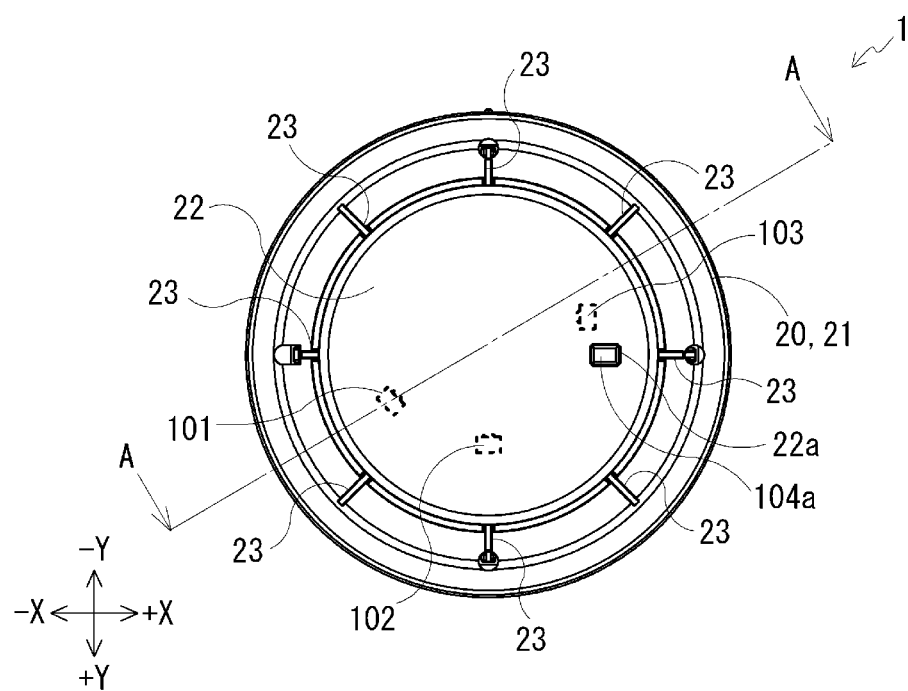

[Fig. 3]
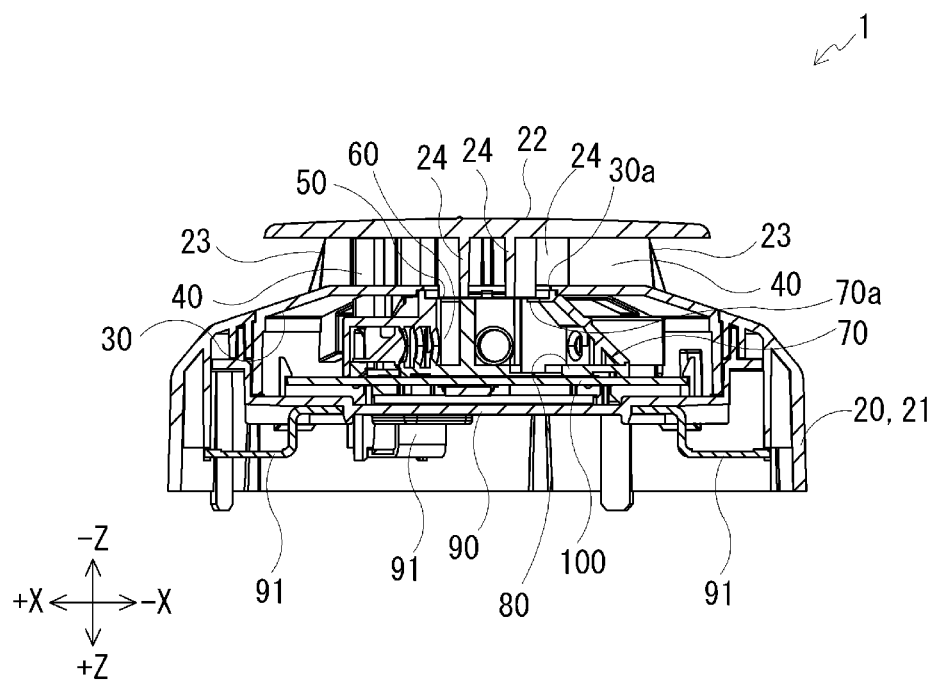

[Fig. 4]
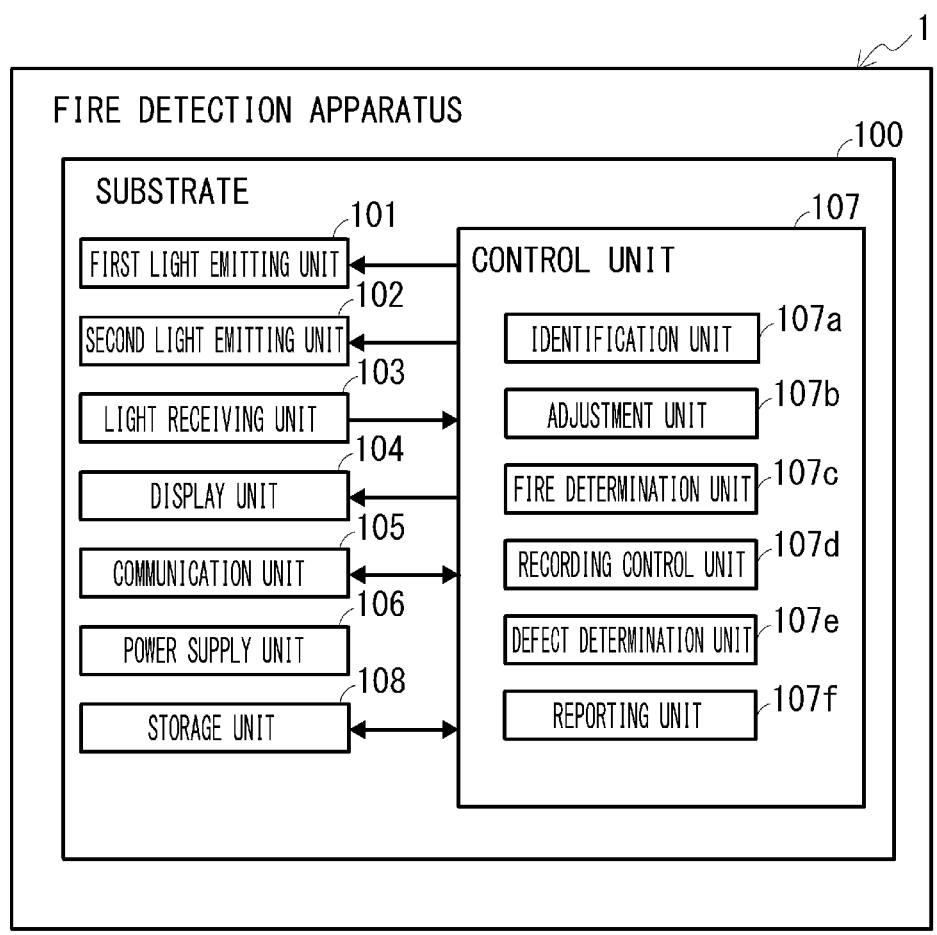

[Fig. 5]
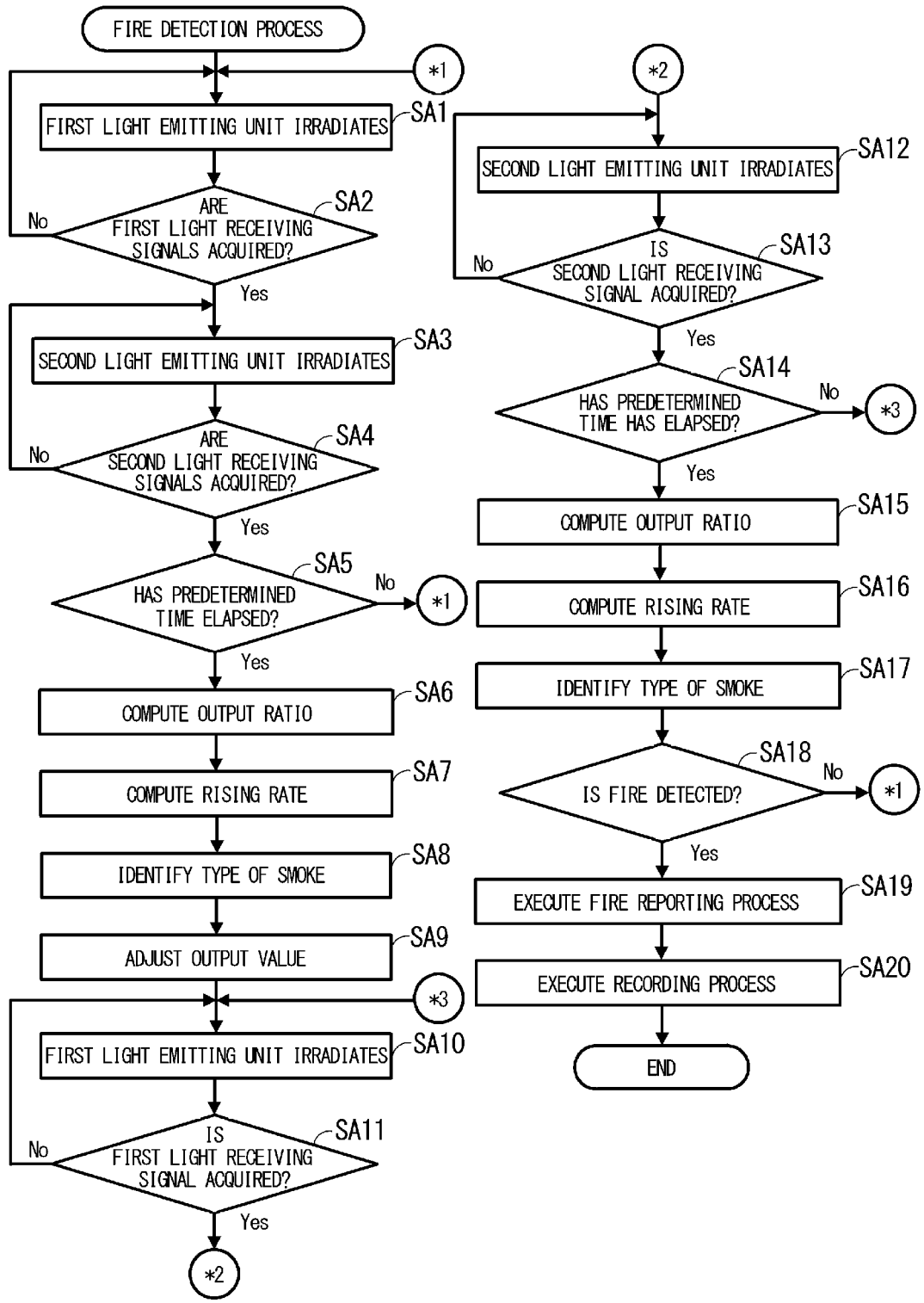

[Fig. 6]
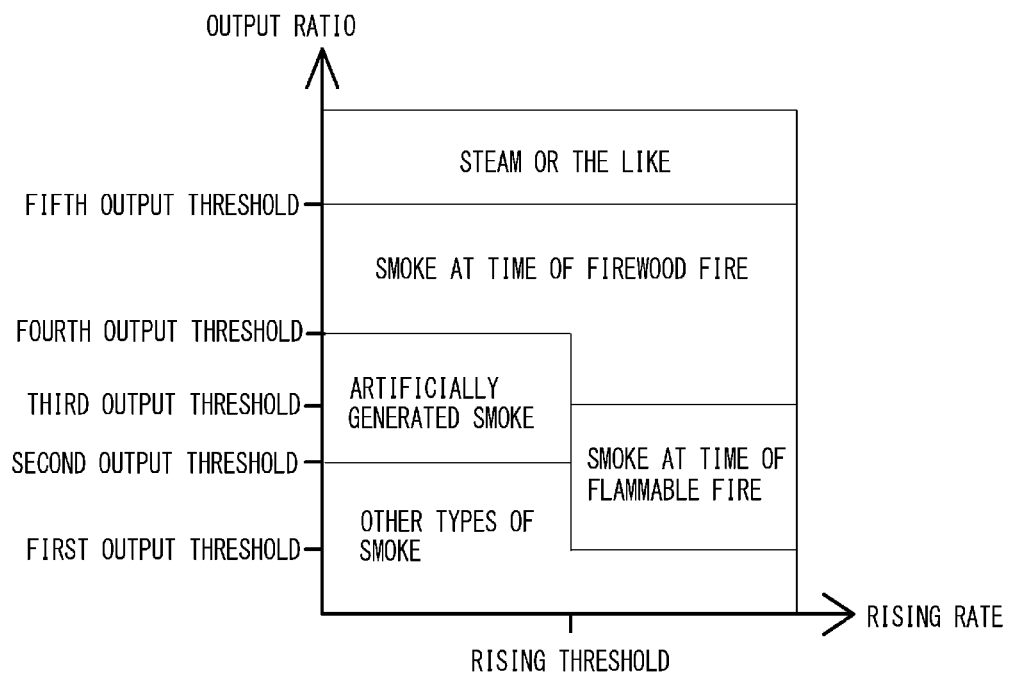

[Fig. 7]
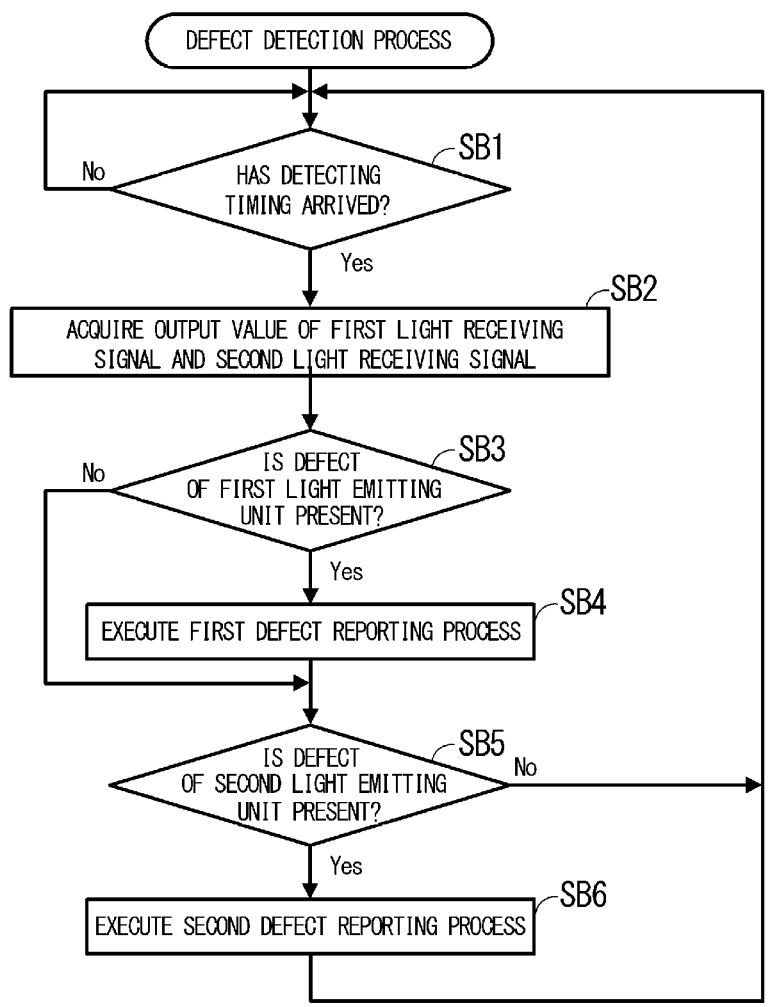

FIRE DETECTION APPARATUS

CROSS REFERENCE TO RELATED APPLICATIONS

This application is a continuation-in-part of International Application No. PCT/JP2019/012774, filed on Mar. 26, 2019, and claims the benefit of Japanese Patent Application No. 2018-062683, filed on Mar. 28, 2018. The entire content of these applications are incorporated by reference.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a fire detection apparatus.

BACKGROUND ART

Conventionally, as a technology for detecting a fire on the basis of a type of smoke for a smoke detector that detects a fire in a monitored area, there has been a proposed technology for alternately irradiating light rays at different timings from two light emitting means for irradiating a detection space with light rays having different wavelengths, receiving each of scattered light rays of the irradiated light rays due to smoke using light receiving means, and then identifying a type of smoke on the basis of a ratio of output values of two light receiving signals output from the light receiving means and corresponding to the respective light emitting means (for example, see Patent Document 1).

CITATION LIST

Patent Document

Patent Document 1: Laid-open Patent Application Publication in Japan No. 11-23458

SUMMARY OF THE INVENTION

Technical Problem

Incidentally, in recent years, there is an increasing need to determine the type of smoke in more detail to improve fire detection accuracy. However, in the above-described conventional technology, as described above, since the smoke type is merely identified on the basis of only the ratio of the output values of the two light receiving signals, it is difficult to identify the smoke type in detail. Therefore, for example, it is difficult to identify smoke at the time of flammable fire at an early stage or to accurately identify artificially generated smoke. Therefore, there is room for improvement from a viewpoint of improving the fire detection accuracy.

It is an object of the present invention to solve the problems of the above mentioned prior arts.

One aspect of the present invention provides is a fire detection apparatus comprises: a first light emitting unit that irradiates a detection space located inside or outside the fire detection apparatus with first detection light; a second light emitting unit that irradiates the detection space with second detection light having a different wavelength from a wavelength of the first detection light; a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light; and an identification unit that identifies a type of smoke present in the detection space on the basis of an output ratio of an output value of the first light receiving signal to an output value of the second light receiving signal output from the light receiving unit and a rising rate of the output value of the first light receiving signal or the second light receiving signal.

BRIEF DESCRIPTION OF THE DRAWINGS

FIG. 1 is a side view illustrating an attachment state of a fire detection apparatus according to an embodiment.

FIG. 2 is a bottom view illustrating the fire detection apparatus in a state of removing an attachment base.

FIG. 3 is a cross-sectional view taken along A-A line of FIG. 2.

FIG. 4 is a block diagram illustrating an electrical configuration of the fire detection apparatus.

FIG. 5 is a flowchart of a fire detection process according to the embodiment.

FIG. 6 is a diagram illustrating types of smoke, in which a horizontal axis indicates a rising rate, and a vertical axis indicates an output ratio.

FIG. 7 is a flowchart of a defect detection process according to the embodiment.

DESCRIPTION OF EMBODIMENTS

Hereinafter, an embodiment of a fire detection apparatus according to the invention will be described in detail with reference to drawings. First, [I] a basic concept of the embodiment will be described, and then [II] specific content of the embodiment will be described. Finally, [III] modifications to the embodiment will be described. However, the invention is not limited by the embodiments.

[I] Basic Concept of Embodiment

First, the basic concept of the embodiment will be described. The embodiment generally relates to the fire detection apparatus for detecting and reporting a fire in a monitored area.

Here, in the embodiment, the "fire detection apparatus" is an apparatus that optically detects and reports a fire in the monitored area, and is a concept including, for example, an optical fire detector, a fire alarm, etc. In addition, the "monitored area" is an area to be monitored and is a concept including, for example, an area inside a building, an area outside the building, etc. In addition, a specific structure or type of the "building" is arbitrary. However, for example, the "building" is a concept including, for example, a detached house, a complex building such as a row house or an apartment, an office building, an event facility, a commercial facility, a public facility, etc. In addition, "reporting" is a concept including, for example, outputting predetermined information to an external apparatus, displaying predetermined information or outputting the predetermined information as a sound via an output unit (a display unit or a sound output unit), etc. Hereinafter, in the embodiment, a case where the "fire detection apparatus" corresponds to the "optical fire detector" and the "monitored area" corresponds to the "area inside the office building" will be described.

[II] Specific Content of Embodiment

Next, the specific content of the embodiment will be described.

Configuration

First, a description will be given of a configuration of the fire detection apparatus according to the embodiment. FIG. 1 is a side view illustrating an attachment state of the fire detection apparatus according to an embodiment. FIG. 2 is a bottom view illustrating the fire detection apparatus in a state of removing an attachment base described below. FIG. 3 is a cross-sectional view taken along A-A line of FIG. 2. In the following description, an X direction of FIG. 1 is referred to as a left-right direction of the fire detection apparatus (a +X direction is a left direction of the fire detection apparatus and a −X direction is a right direction of the fire detection apparatus), a Y direction of FIG. 2 is referred to as a front-back direction of the fire detection apparatus (a +Y direction is a frontward direction of the fire detection apparatus and a −Y direction is a backward direction of the fire detection apparatus), and a Z direction of FIG. 1 is referred to as a vertical direction of the fire detection apparatus (a +Z direction is an upward direction of the fire detection apparatus and a −Z direction is a downward direction of the fire detection apparatus). In addition, with reference to a center position of the detection space of FIG. 3, a direction away from the detection space is referred to as an "outer side", and a direction approaching the detection space is referred to as an "inner side".

The fire detection apparatus 1 is an apparatus that detects and reports a substance to be detected (for example, smoke, etc.) contained in gas. The fire detection apparatus 1 is installed on an installation surface 2 on a lower surface of a ceiling portion of a building in an interior of the building, and includes an attachment base 10, an outer cover 20, an inner cover 30, an inflow space 40, an insect screen 50, a detection space 60, a detector cover 70, a detector body 80, a terminal board 90, and a substrate 100 as illustrated in FIG. 1 to FIG. 3.

Configuration—Attachment Base

Returning to FIG. 1, the attachment base 10 is an attaching unit that attaches the outer cover 20 to the installation surface 2. The attachment base 10 is configured using, for example, a known attachment base for the fire detection apparatus (as an example, a substantially plate-shaped attachment base made of resin), etc., and is fixed to the installation surface 2 by a fixing tool, etc. as illustrated in FIG. 1.

Configuration—Outer Cover

The outer cover 20 is a cover that covers the inner cover 30, the inflow space 40, the insect screen 50, the detection space 60, the detector cover 70, the detector body 80, the terminal board 90, and the substrate 100. The outer cover 20 is formed of, for example, a resin material having a light shielding property, and includes an outer cover body 21, a top surface portion 22, a first rib portion 23, and a second rib portion 24 as illustrated in FIG. 1 to FIG. 3.

Among these portions, the outer cover body 21 is a basic structure of the outer cover 20. The outer cover body 21 is formed of, for example, a substantially hollow cylindrical body whose upper surface and lower surface are open, is disposed so that an upper end portion of the outer cover body 21 comes into contact with a lower surface of the attachment base 10 as illustrated in FIG. 1, and is fixed to the attachment base 10 by a fitting structure (or the fixing tool), etc.

In addition, the top surface portion 22 is a partition unit that partitions the inflow space 40. The top surface portion 22 is formed of, for example, a substantially circular plate-shaped body, and is provided substantially horizontally below the outer cover body 21 as illustrated in FIG. 1 to FIG. 3. In addition, as illustrated in FIG. 2, a display hole 22a is provided in the top surface portion 22. The display hole 22a is a through-hole for guiding light irradiated from a display unit 104 (described below) to the outside of the fire detection apparatus 1 through a light guide 104a and the display hole 22a of FIG. 2.

In addition, the first rib portion 23 is a partition unit that partitions the inflow space 40. The first rib portion 23 is formed in a substantially plate-shaped body, and is provided vertically between the outer cover body 21 and the top surface portion 22. Specifically, as illustrated in FIG. 1 and FIG. 3, a plurality of first rib portions 23 is provided radially from the vicinity of a center of the outer cover 20, and is connected to the outer cover body 21 and the top surface portion 22.

In addition, the second rib portion 24 is a partition unit that partitions the inflow space 40. The second rib portion 24 is formed in a substantially plate-shaped body, and is provided vertically between the outer cover body 21 and the top surface portion 22. Specifically, as illustrated in FIG. 1 and FIG. 3, a plurality of second rib portions 24 is provided between inner end portions of adjacent first rib portions 23, and is connected to the outer cover body 21 and the top surface portion 22.

Configuration—Inflow Space

Returning to FIG. 1, the inflow space 40 is a space for allowing gas outside the fire detection apparatus 1 to flow into the fire detection apparatus 1. A plurality of inflow spaces 40 is formed inside the outer cover 20. Specifically, as illustrated in FIG. 1 and FIG. 3, a space surrounded by the top surface portion 22, the first rib portion 23, the second rib portion 24, and the inner cover 30 in an internal space of the outer cover 20 is formed as the inflow space 40.

Configuration—Inner Cover

The inner cover 30 is a cover that covers the detection space 60, the detector cover 70, the detector body 80, and the substrate 100, and is a partition unit that partitions the inflow space 40. The inner cover 30 is, for example, a substantially hollow cylindrical body whose upper surface is opened, is formed of a resin material having a light shielding property, and is provided so that a lower surface of the inner cover 30 faces the top surface portion 22 of the outer cover 20 through the inflow space 40 on the inside of the outer cover 20 as illustrated in FIG. 3. In addition, as illustrated in FIG. 3, a first opening 30a is formed in the lower surface of the inner cover 30. The first opening 30a is an opening for sending gas flowing into the inflow space 40 to the detection space 60, and is provided at a substantially central portion and the vicinity thereof in the lower surface of the inner cover 30 as illustrated in FIG. 3.

Configuration—Detection Space

The detection space 60 is a space for detecting a substance to be detected. As illustrated in FIG. 3, a space surrounded by the detector cover 70 and the detector body 80 in an internal space of the inner cover 30 is formed as the detection space 60.

Configuration—Detector Cover

The detector cover 70 is a partition unit that partitions the detection space 60, and is an incidence suppression unit that suppresses incidence of ambient light into the detection space 60. The detector cover 70 is a substantially hollow cylindrical body whose upper surface is open, and is formed of a resin material having a light shielding property. In addition, as illustrated in FIG. 3, the detector cover 70 is disposed so that a lower surface of the detector cover 70 faces the top surface portion 22 of the outer cover 20 through the first opening 30a and the inflow space 40 on the inside of the inner cover 30, and is fixed to the detector body 80. In addition, as illustrated in FIG. 3, a second opening 70a is formed in the lower surface of the detector cover 70. The second opening 70a is an opening for allowing gas sent from the first opening 30a to flow into the detection space 60, and is provided at a portion corresponding to the first opening 30a on the lower surface of the detector cover 70 as illustrated in FIG. 3.

Configuration—Insect Screen

The insect screen 50 is a net for preventing insects present outside the fire detection apparatus 1 from intruding into the detection space 60. The insect screen 50 is configured using a mesh-like and circular net, and is attached to the detector cover 70 as illustrated in FIG. 3.

Configuration—Detector Body

The detector body 80 is an attaching unit that attaches the detector cover 70, and is an incidence suppression unit that suppresses incidence of ambient light into the detection space 60. The detector body 80 is formed of, for example, a resin material having a light shielding property, is disposed to cover an upper surface of the detector cover 70 as illustrated in FIG. 3, and is fixed to the substrate 100 by a fixing tool, etc. In addition, the detector body 80 is provided with a support (not illustrated) for supporting each of a first light emitting unit 101 (described below), a second light emitting unit 102 (described below), and a light receiving unit 103 (described below). Furthermore, each optical path hole (not illustrated) for forming an optical path between the detection space 60 and each of the first light emitting unit 101 (described below), the second light emitting unit 102 (described below), and the light receiving unit 103 (described below) is formed in the detector body 80.

Configuration—Terminal Board

The terminal board 90 is an accommodation unit that accommodates the inner cover 30, the detector cover 70, the detector body 80, and the substrate 100. The terminal board 90 has a substantially hollow cylindrical shape whose lower surface is open, and is formed of, for example, a resin material having a light shielding property. In addition, as illustrated in FIG. 3, the terminal board 90 is provided to cover the inner cover 30, the detector cover 70, the detector body 80, and the substrate 100 from above, is fixed to the outer cover 20 by a fitting structure, etc., and is fixed to the attachment base 10 by a fixing tool, etc. through a first attachment hole (not illustrated) formed in an attachment member 91.

Configuration—Substrate

FIG. 4 is a block diagram illustrating an electrical configuration of the fire detection apparatus 1. The substrate 100 is a mounting unit on which various electric circuits (not illustrated) are mounted. The substrate 100 is configured using, for example, a known flat plate-shaped circuit board, etc., is disposed substantially horizontally at a distance from an upper end portion and a lower end portion of the terminal board 90 in the terminal board 90 as illustrated in FIG. 3, and is fixed to the terminal board 90 by a fixing tool through an attachment hole (not illustrated) formed in the terminal board 90 and a second attachment hole (not illustrated) formed in the attachment member 91.

Further, in addition to the fact that a known electronic component used for the conventional fire detection apparatus 1 is mounted on the substrate 100, as illustrated in FIG. 4, the first light emitting unit 101, the second light emitting unit 102, the light receiving unit 103, a display unit 104, a communication unit 105, a power supply unit 106, a control unit 107, and a storage unit 108 are mounted on the substrate 100.

Configuration—Substrate—First Light Emitting Unit, Second Light Emitting Unit, and Light Receiving Unit Among these units, the first light emitting unit 101 is a first light emitting unit that irradiates the detection space 60 with detection light (hereinafter referred to as "first detection light") through the optical path hole of the detector body 80, and is configured using, for example, a known light emitting element (as an example, an infrared light emitting diode (LED), etc.). In addition, the second light emitting unit 102 is a second light emitting unit that irradiates the detection space 60 with detection light (hereinafter referred to as "second detection light") having a different wavelength from that of the first detection light through the optical path hole of the detector body 80, and is configured using, for example, a known light emitting element (as an example, an blue LED, etc.). In addition, the light receiving unit 103 is a light receiving unit that receives scattered light of the first detection light irradiated from the first light emitting unit 101 due to smoke through the optical path hole of the detector body 80, outputs a first light receiving signal according to the received scattered light, receives scattered light of the second detection light irradiated from the second light emitting unit 102 with respect to smoke through the optical path hole, and outputs a second light receiving signal according to the received scattered light, and is configured using, for example, a known light receiving element (as an example, a photodiode, etc.). In addition, a method of installing the first light emitting unit 101, the second light emitting unit 102, and the light receiving unit 103 is arbitrary. However, in the embodiment, installation is performed to be able to avoid direct reception of the first detection light or the second detection light irradiated from the first light emitting unit 101 or the second light emitting unit 102 to the light receiving unit 103 through various optical path holes of the detector body 80. For example, as illustrated in FIG. 2, the first light emitting unit 101 and the light receiving unit 103 are installed at a position at which an angle between an optical axis of the first light emitting unit 101 (hereinafter referred to as a "first light emitting-side optical axis") and an optical axis of the light receiving unit 103 (hereinafter referred to as a "light receiving-side optical axis") is about 135°. In addition, the second light emitting unit 102 and the light receiving unit 103 are installed at a position at which an angle between an optical axis of the second light emitting unit 102 (hereinafter referred to as a "second light emitting-side optical axis") and the light receiving-side optical axis is about 90°.

Configuration—Substrate—Display Unit, Communication Unit, and Power Supply Unit

In addition, the display unit 104 is a display unit that displays various types of information (for example, information indicating the presence or absence of detection of a fire), and is configured using, for example, a known display unit (an LED, etc.). Incidentally, a light projection method of the display unit 104 is arbitrary. However, examples thereof include light projection by guiding light from the display unit 104 toward the outside of the fire detection apparatus 1 through the light guide 104a inserted into insertion holes (not illustrated) provided in each of the inner cover 30, the detector cover 70, and the detector body 80 and the display hole 22a of the outer cover 20. In addition, the communication unit 105 is a communication unit that communicates with an external apparatus (for example, a receiver, etc.). In addition, the power supply unit 106 is a power supply unit that supplies power supplied from a commercial power supply or a battery (not illustrated) to each unit of the fire detection apparatus 1.

Configuration—Substrate—Control Unit

In addition, the control unit 107 is a control unit that controls the fire detection apparatus 1. Specifically, the control unit 107 is a computer including a central processing unit (CPU) and an internal memory such as a random access memory (RAM) for storing various programs (including a basic control program such as the OS and an application program activated on the OS to realize a specific function) to be interpreted and executed on the CPU, a program, and various data.

In addition, as illustrated in FIG. 4, the control unit 107 functionally and conceptually includes an identification unit 107a, an adjustment unit 107b, a fire determination unit 107c, a recording control unit 107d, a defect determination unit 107e, and a reporting unit 107f.

The identification unit 107a is an identification unit that identifies a type of smoke in the detection space 60 on the basis of an output ratio of an output value of the first light receiving signal to an output value of the second light receiving signal output from the light receiving unit 103 (hereinafter referred to as an "output ratio"), and a rising rate of the output value of the first light receiving signal or the second light receiving signal (hereinafter referred to as a "rising rate"). Here, in the embodiment, a description is given on the assumption that the "type of smoke" includes smoke at the time of flammable fire, smoke at the time of firewood fire, artificially generated smoke (as an example, smoke generated when cooking a hamburger, etc.), steam, water mist, dust, etc. However, the type is not limited thereto. For example, it is possible to include other types of smoke.

The adjustment unit 107b is an adjustment unit that adjusts the output value of the first light receiving signal or the output value of the second light receiving signal in accordance with a type of smoke identified by the identification unit 107a.

The fire determination unit 107c is a fire determination unit that determines the presence or absence of a fire on the basis of the output value of the first light receiving signal or the output value of the second light receiving signal adjusted by the adjustment unit 107b.

The recording control unit 107d is a recording control unit that stores a determination result of the fire determination unit 107c in the storage unit 108 as history information.

The defect determination unit 107e is a defect determination unit that determines presence or absence of a defect of the first light emitting unit 101 or the second light emitting unit 102.

The reporting unit 107f is a reporting unit that reports the determination result by the defect determination unit 107e. Incidentally, details of a process executed by the control unit 107 will be described below.

Configuration—Substrate—Storage Unit

In addition, the storage unit 108 is a storage unit that stores programs and various data necessary for an operation of the fire detection apparatus 1. The storage unit 108 is configured using a rewritable recording medium. For example, it is possible to use a non-volatile recording medium such as a flash memory.

Process

Next, a description will be given of a process executed by the fire detection apparatus 1 configured as described above. The process executed by the fire detection apparatus 1 is roughly divided into a fire detection process and a defect detection process. Hereinafter, each of the fire detection process and the defect detection process will be described.

Process—Fire Detection Process

First, the fire detection process will be described. FIG. 5 is a flowchart of the fire detection process according to the embodiment (in the description of each process below, a step is abbreviated as "S"). The fire detection process is generally a process of detecting a fire in the monitored area. A timing at which the fire detection process is executed is arbitrary. However, in the embodiment, a description will be given on the assumption that the process is started after a power supply of the fire detection apparatus 1 is turned ON.

When the fire detection process is started, as illustrated in FIG. 5, in SA1, the control unit 107 causes the first light emitting unit 101 to irradiate the first detection light.

In SA2, the control unit 107 determines whether at least one or more first light receiving signals output from the light receiving unit 103 are acquired. Then, the control unit 107 proceeds to SA1 when it is determined that the first light receiving signal is not obtained (SA2, No), and proceeds to SA3 after stopping irradiation of the first light emitting unit 101 when it is determined that the first light receiving signal is obtained (SA2, Yes).

In SA3, the control unit 107 causes the second light emitting unit 102 to irradiate the second detection light.

In SA4, the control unit 107 determines whether at least one or more second light receiving signals output from the light receiving unit 103 are acquired. Then, the control unit 107 proceeds to SA3 when it is determined that the second light receiving signal is not obtained (SA4, No), and proceeds to SA5 after stopping irradiation of the second light emitting unit 102 when it is determined that the second light receiving signal is obtained (SA4, Yes).

In SA5, the control unit 107 determines whether a predetermined time has elapsed. Then, the control unit 107 proceeds to SA1 when it is determined that the predetermined time has not elapsed (SA5, No), and proceeds to SA6 when it is determined that the predetermined time has elapsed (SA5, Yes).

In SA6, the identification unit 107a computes an output ratio on the basis of the first light receiving signal acquired in SA2 and the second light receiving signal acquired in SA4. A method of computing the output ratio is arbitrary. However, for example, first, an output value of the most recently acquired first light receiving signal is extracted from among the first light receiving signals acquired in SA2 until the predetermined time elapses in SA5. Subsequently, an output value of the most recently acquired second light receiving signal is extracted from among the second light receiving signals acquired in SA4 until the predetermined time elapses in SA5. Then, computing is performed by calculating the output value of the extracted second light receiving signal from the output value of the extracted first light receiving signal (incidentally, this description is similarly applied to SA15 described below).

In SA7, the identification unit 107a computes the rising rate on the basis of the first light receiving signal acquired in SA2 or the second light receiving signal acquired in SA4. A method of computing the rising rate is arbitrary. However, for example, until the predetermined time elapses in SA5, an output value of the first light receiving signal acquired first is extracted from among the first light receiving signals acquired in SA2, and an output value of the first light receiving signal acquired most recently (lastly) is extracted. Then, computing is performed on the basis of these extracted output values and Equation (1) below (incidentally, this description is similarly applied to SA16 described below).

Rising rate=(output value of most recently acquired first light receiving signal)/(output value of first light receiving signal acquired first)−1   Equation (1)

In SA8, the identification unit 107a identifies a type of smoke on the basis of the output ratio computed in SA6 and the rising rate computed in SA7.

Here, a method of identifying a type of smoke is arbitrary. However, in the embodiment, the method is as follows (incidentally, this description is similarly applied to SA17 described below). FIG. 6 is a diagram illustrating a type of smoke, in which a horizontal axis indicates a rising rate and a vertical axis indicates an output ratio. That is, when the rising rate is larger than a rising threshold, and the output ratio is larger than a first output threshold and smaller than a third output threshold, as illustrated in FIG. 6, a type of smoke is identified as smoke at the time of flammable fire. In addition, when the rising rate is smaller than the rising threshold, and the output ratio is larger than a second output threshold and smaller than a fourth output threshold, as illustrated in FIG. 6, a type of smoke is identified as artificially generated smoke. In addition, when the rising rate is smaller than the rising threshold, and the output ratio is larger than the fourth output threshold and smaller than a fifth output threshold, or when the rising rate is larger than the rising threshold, and the output ratio is larger than the third output threshold and smaller than the fifth output threshold, as illustrated in FIG. 6, a type of smoke is identified as smoke at the time of firewood fire. In addition, regardless of the magnitude of the rising rate, when the output ratio is larger than the fifth output threshold, as illustrated in FIG. 6, a type of smoke is identified as steam, water mist, or dust. In addition, when the rising rate is smaller than the rising threshold, and the output ratio is smaller than the second output threshold, or when the rising rate is larger than the rising threshold, and the output ratio is smaller than the first output threshold, as illustrated in FIG. 6, a type of smoke is identified as other types of smoke (for example, smoke including flammable fire). In this way, a type of smoke may be identified as smoke at the time of flammable fire, smoke at the time of firewood fire, artificially generated smoke, steam, water mist, dust, and other types of smoke, and it is possible to identify a type of smoke in more detail.

In SA9, the adjustment unit 107b adjusts the output value of the first light receiving signal or the output value of the second light receiving signal output from the light receiving unit 103 in accordance with the type of smoke identified in SA8.

A method of adjusting the output value is arbitrary. However, in the embodiment, the method is as follows. That is, when the type of smoke is identified as smoke at the time of flammable fire in SA8, only the output value of the first light receiving signal is increased, for example, increased to about twice the output value in order to allow flammable fire to be detected at an early stage since the amount of smoke at the time of flammable fire is smaller than the amount of smoke at the time of firewood fire. In addition, when the type of smoke is identified as artificially generated smoke in SA8, only the output value of the first light receiving signal is decreased, for example, decreased to about half the output value in order to carefully distinguish artificially generated smoke since it is difficult to distinguish between artificially generated smoke and smoke at the time of firewood fire, and there is a need to detect a fire during cooking. In addition, when the type of smoke is identified as smoke at the time of firewood fire, steam, water mist, dust, or other types of smoke in SA8, the output value of the first light receiving signal and the output value of the second light receiving signal are maintained. In this way, it is possible to correctly re-identify the type of smoke in SA17 described below.

Returning to FIG. 5, in SA10, the control unit 107 causes the first light emitting unit 101 to irradiate the first detection light.

In SA11, the control unit 107 determines whether at least one or more first light receiving signal output from the light receiving unit 103 is acquired. Then, the control unit 107 proceeds to SA10 when it is determined that the first light receiving signal is not obtained (SA11, No), and proceeds to SA12 after stopping irradiation of the first light emitting unit 101 when it is determined that the first light receiving signal is obtained (SA11, Yes).

In SA12, the control unit 107 causes the second light emitting unit 102 to irradiate the second detection light.

In SA13, the control unit 107 determines whether at least one or more second light receiving signal output from the light receiving unit 103 is acquired. Then, the control unit 107 proceeds to SA12 when it is determined that the second light receiving signal is not obtained (SA13, No), and proceeds to SA14 after stopping irradiation of the second light emitting unit 102 when it is determined that the second light receiving signal is obtained (SA13, Yes).

In SA14, the control unit 107 determines whether a predetermined time has elapsed. Then, the control unit 107 proceeds to SA10 when it is determined that the predetermined time has not elapsed (SA14, No), and proceeds to SA15 when it is determined that the predetermined time has elapsed (SA14, Yes).

In SA15, the identification unit 107a computes the output ratio on the basis of the first light receiving signal acquired in SA11 and the second light receiving signal acquired in SA13.

In SA16, the identification unit 107a computes the rising rate on the basis of the first light receiving signal acquired in SA11 or the second light receiving signal acquired in SA13.

In SA17, the identification unit 107a re-identifies the type of smoke on the basis of the output ratio computed in SA15 and the rising rate computed in SA16.

In SA18, the fire determination unit 107c determines the presence or absence of a fire on the basis of the type of smoke re-identified in SA17. A method of determining the presence or absence of a fire is arbitrary. However, in the embodiment, it is determined that a fire is detected when the type of smoke is identified as smoke at the time of flammable fire, smoke at the time of firewood fire, or other types of smoke in SA17, and it is determined that a fire is not detected when the type of smoke is identified as artificially generated smoke, steam, water mist, or dust in SA17. Then, when it is determined that a fire is not detected (SA18, No), the fire determination unit 107c proceeds to SA1 and repeats processing of SA1 to SA17 until it is determined that a fire is not detected in SA18. On the other hand, when it is determined that a fire is detected (SA18, Yes), the process proceeds to SA19. Incidentally, for example, in a case in which it is determined that a fire is not detected in SA18 when the output value of the first light receiving signal or the output value of the second light receiving signal is adjusted in SA9, the fire determination unit 107c proceeds to SA1 after returning to a state before the output value of the first light receiving signal or the output value of the second light receiving signal is adjusted.

In SA19, the reporting unit 107f executes a fire reporting process. Here, the "fire reporting process" is a process of reporting that a fire is detected in SA18. Specifically, the reporting unit 107f outputs a signal including information indicating that a fire is detected in SA18 (hereinafter, referred to as a "fire signal") to an external apparatus. In this way, it is possible to report information indicating that a fire is detected to the external device, and to improve convenience of the user in detecting the fire. For example, when the external apparatus is the receiver, the receiver can execute a fire extinguishing process using a predetermined fire extinguishing facility on the basis of the fire signal input from the fire detection apparatus 1.

In SA20, the recording control unit 107d records a determination result of SA18 in a recording unit as history information, and then ends the fire detection process. Here, a method of recording the determination result of SA18 is arbitrary. However, for example, information indicating that the fire is detected in SA18 and information indicating a time when the fire is detected are mutually associated with each other and recorded in a history table (not illustrated) provided in the recording unit. Then, these pieces of information are recorded as history information by successively recording these pieces of information in the history table each time the process of SA20 is performed. In this way, the determination result of the fire determination unit 107c can be recorded as history information. For example, the user can detect details of an incorrect report.

Such a fire detection process allows the type of smoke to be identified in detail (in particular, it is possible to accurately identify smoke at the time of flammable fire and artificially generated smoke) when compared to a conventional technology (a technology for identifying a type of smoke on the basis of only a ratio of output values of two light receiving signals). Therefore, it is possible to accurately perform fire detection based on the type of smoke, and to improve fire detection accuracy. In addition, it is possible to determine the presence or absence of a fire on the basis of the output value of the first light receiving signal or the output value of the second light receiving signal adjusted by the adjustment unit 107b, and to more accurately perform fire detection based on the type of smoke.

Process—Defect Detection Process

Next, the defect detection process will be described. FIG. 7 is a flowchart of the defect detection process according to the embodiment. The defect detection process is generally a process of detecting a defect of the first light emitting unit 101 or the second light emitting unit 102. A timing at which the defect detection process is executed is arbitrary. However, in the embodiment, a description is given on the assumption that the process is started after the power supply of the fire detection apparatus 1 is turned ON and executed in parallel with the fire detection process.

When the defect detection process is started, as illustrated in FIG. 7, in SB1, the control unit 107 determines whether a timing of detecting a defect of the first light emitting unit 101 or the second light emitting unit 102 (hereinafter referred to as a "detection timing") has arrived. A method of determining whether the detection timing has arrived is arbitrary. However, for example, determination is made on the basis of whether a predetermined time has elapsed since a control process was started, whether a predetermined time has elapsed since it was determined that a defect of the second light emitting unit 102 is not detected in SB5 described below, or whether a predetermined time has elapsed since processing of SB6 described below ended. Here, it is determined that the detection timing has arrived when any one of the predetermined times has elapsed, and it is determined that the detection timing has not arrived when none of the predetermined times has elapsed. Then, the control unit 107 stands by until the detection timing arrives (SB1, No), and proceeds to SB2 when it is determined that the detection timing has arrived (SB1, Yes).

In SB2, the control unit 107 acquires the output value of the first light receiving signal and the output value of the second light receiving signal. A method of acquiring the output values is arbitrary. However, for example, a plurality of first light receiving signals and a plurality of second light receiving signals acquired within a predetermined period (as an example, a period from start of processing of SB2 before a predetermined time, etc.) are extracted from among the first light receiving signals and the second light receiving signals acquired in the fire detection process, and the output value of each of the extracted plurality of first light receiving signals and second light receiving signals is acquired.

In SB3, the defect determination unit 107e determines the presence or absence of a defect of the first light emitting unit 101. Here, a method of determining the presence or absence of a defect of the first light emitting unit 101 is arbitrary. However, for example, determination is made on the basis of whether the output values of the plurality of first light receiving signals acquired in SB2 satisfy a reference value. When at least some of the output values of the plurality of first light receiving signals do not satisfy the reference value, it is determined that the defect of the first light emitting unit 101 is detected. When all the output values of the plurality of first light receiving signals satisfy the reference value, it is determined that the defect of the first light emitting unit 101 is not detected (incidentally, this description is similarly applied to processing of SB5 described below). Then, the defect determination unit 107e proceeds to SB4 when it is determined that the defect of the first light emitting unit 101 is detected (SB3, Yes), and proceeds to SB5 when it is determined that the defect of the first light emitting unit 101 is not detected (SB3, No).

In SB4, the reporting unit 107f executes a first defect reporting process. Here, the "first defect reporting process" is a process of reporting that the defect of the first light emitting unit 101 is detected in SB3. Specifically, the reporting unit 107f outputs a signal including information indicating that the defect of the first light emitting unit 101 is detected in SB3 (hereinafter, referred to as a "first defect signal") to an external apparatus.

In SB5, the defect determination unit 107e determines the presence or absence of a defect of the second light emitting unit 102. Then, the defect determination unit 107e proceeds to SB6 when it is determined that the defect of the second light emitting unit 102 is detected (SB5, Yes), and proceeds to SB1 when it is determined that the defect of the second light emitting unit 102 is not detected (SB5, No).

In SB6, the reporting unit 107f executes a second defect reporting process. Here, the "second defect reporting process" is a process of reporting that the defect of the second light emitting unit 102 is detected in SB5. Specifically, the reporting unit 107f outputs a signal including information indicating that the defect of the second light emitting unit 102 is detected in SB5 (hereinafter, referred to as a "second defect signal") to an external apparatus. Then, after processing of SB6, the control unit 107 proceeds to SB1 to repeat processing of SB1 to SB6.

By such a defect detection process, it is possible to report a determination result by the defect determination unit 107e, and the user can take measures against the defect of the first light emitting unit 101 or the second light emitting unit 102.

Effects of Embodiment

As described above, according to the embodiment, the light receiving unit 103 that receives scattered light of the first detection light irradiated from the first light emitting unit 101 due to smoke, outputs the first light receiving signal according to the received scattered light, receives scattered light of the second detection light irradiated from the second light emitting unit 102 due to smoke, and outputs the second light receiving signal according to the received scattered light, and the identification unit 107a that identifies a type of smoke present in the detection space 60 on the basis of the output ratio of the output value of the first light receiving signal to the output value of the second light receiving signal output from the light receiving unit 103 and the rising rate of the output value of the first light receiving signal or the second light receiving signal are included. Thus, when compared to the conventional technology (a technology for identifying a type of smoke on the basis of only a ratio of output values of two light receiving signals), it is possible to identify the type of smoke in detail (in particular, it is possible to accurately identify smoke at the time of flammable fire and artificially generated smoke). Therefore, it is possible to accurately detect a fire based on a type of smoke, and to improve fire detection accuracy.

In addition, since the adjustment unit 107b that adjusts the output value of the first light receiving signal or the output value of the second light receiving signal in accordance with a type of smoke identified by the identification unit 107a, and the fire determination unit 107c that determines the presence or absence of a fire on the basis of the output value of the first light receiving signal or the output value of the second light receiving signal adjusted by the adjustment unit 107b are included, it is possible to determine the presence or absence of a fire on the basis of the output value of the first light receiving signal or the output value of the second light receiving signal adjusted by the adjustment unit 107b, and to more accurately perform fire detection based on the type of smoke.

In addition, since the recording control unit 107d that stores the determination result of the fire determination unit 107c in the storage unit 108 of the fire detection apparatus 1 as history information is included, it is possible to record the determination result of the fire determination unit 107c as history information. For example, the user can detect details of an incorrect report.

In addition, since the type of smoke includes smoke at the time of flammable fire, smoke at the time of firewood fire, artificially generated smoke, and steam, it is possible to identify the type of smoke as smoke at the time of flammable fire, smoke at the time of firewood fire, artificially generated smoke, and steam, and to identify the type of smoke in more detail.

In addition, since the defect determination unit 107e that determines the presence or absence of a defect of the first light emitting unit 101 or the second light emitting unit 102, and the reporting unit 107f for reporting the determination result by the defect determination unit 107e are included, it is possible to report the determination result by the defect determination unit 107e, and the user can take measures against the defect of the first light emitting unit 101 or the second light emitting unit 102.

[III] Modifications to Embodiment

Even though the embodiment according to the invention has been described above, specific configurations and means of the invention can be arbitrarily modified and improved within the scope of the technical idea of each invention described in the claims. Hereinafter, such a modification will be described.

With Regard to Problems to be Solved and Effects of Invention

First, the problems to be solved by the invention and the effects of the invention are not limited to the above contents, and may differ depending on the details of the implementation environment and configuration of the invention. Further, only some of the problems may be solved, or only some of the effects may be achieved.

With Regard to Dispersion and Integration

In addition, each electrical component described above is functionally conceptual, and may not be physically configured as illustrated. That is, specific forms of dispersion and integration of each unit are not limited to the illustrated ones, and all or some thereof can be configured to be functionally or physically dispersed or integrated in an arbitrary unit in accordance with various loads, usage conditions, etc. In addition, the "apparatus" in this application is not limited to one configured by a single apparatus, and includes one configured by a plurality of apparatuses. For example, the fire detection apparatus 1 may be configured by being dispersed into a plurality of apparatuses configured to be able to communicate with each other, the control unit 107 may be provided in some of the plurality of apparatuses, and the storage unit 108 may be provided in some other apparatuses.

With Regard to Application Target of Fire Detection Apparatus

The embodiment describes that the fire detection apparatus 1 is applied to a fire detection apparatus in which the detection space 60 is located inside the fire detection apparatus. However, the invention is not limited thereto. For example, the fire detection apparatus 1 is applicable to a fire detection apparatus in which the detection space 60 is located outside the fire detection apparatus.

With Regard to Insect Screen

The embodiment describes that the insect screen 50 is attached to the detector cover 70. However, the invention is not limited thereto. For example, the insect screen 50 may be attached to the inner cover 30.

With Regard to Fire Detection Process

The embodiment describes that processing of SA9 to SA17 is performed. However, the invention is not limited thereto. For example, processing of SA9 to SA17 may be omitted. In this case, in SA18, the presence or absence of a fire may be determined on the basis of the type of smoke identified in SA8. In addition, the adjustment unit 107*b* may be omitted.

In addition, the embodiment describes that processing of SA20 is performed. However, the invention is not limited thereto. For example, processing of SA20 may be omitted. In this case, the recording control unit 107*d* may be omitted.

In addition, the embodiment describes that the rising rate is computed in SA7 on the basis of the first light receiving signal acquired in SA2. However, the invention is not limited thereto. For example, the rising rate may be computed on the basis of the second light receiving signal acquired in SA4. Alternatively, an average value of the rising rate computed on the basis of the first light receiving signal and the rising rate computed on the basis of the second light receiving signal may be computed as a rising rate to be computed.

In addition, the embodiment describes that the output value of the first light receiving signal is adjusted in SA9. However, the invention is not limited thereto. For example, the output value of the second light receiving signal may be adjusted (as an example, when the type of smoke is identified as smoke at the time of flammable fire in SA8, only the output value of the second light receiving signal may be lowered). Alternatively, the output value of the first light receiving signal and the output value of the second light receiving signal may be adjusted.

In addition, the embodiment describes that the fire signal is output to the external apparatus in SA19. However, the invention is not limited thereto. For example, the fire detection apparatus 1 may include an output unit (for example, a display unit or a sound output unit), and the output unit may display information indicating that a fire is detected in SA18 or output the information as a sound.

In addition, the embodiment describes that after the type of smoke is identified in SA8, the type of smoke is re-identified on the basis of the output value of the first light receiving signal or the output value of the second light receiving signal adjusted by the adjustment unit 107*b*, and the presence or absence of a fire is determined on the basis of the type of smoke re-identified by the fire determination unit 107*c*. However, the invention is not limited thereto. For example, the presence or absence of a fire may be determined on the basis of whether the output value of the first light receiving signal adjusted by the adjustment unit 107*b* (or the output value of the second light receiving signal) is greater than or equal to a determination reference value (specifically, an output value serving as a criterion) after the type of smoke is identified in SA8. Alternatively, the presence or absence of a fire may be determined on the basis of whether a time during which the output value of the first light receiving signal (or the output value of the second light receiving signal) continues at a predetermined amount or more is greater than or equal to a determination reference value (specifically, a time serving as a criterion) after the type of smoke is identified in SA8. Alternatively, when the fire detection apparatus includes an adjustment unit that adjusts a determination reference value in accordance with the type of smoke identified by the identification unit 107*a*, determination may be made as follows. That is, the presence or absence of a fire may be determined on the basis of whether the output value of the first light receiving signal is greater than or equal to a determination reference value adjusted by the adjustment unit after the type of smoke is identified in SA8. Alternatively, the presence or absence of a fire may be determined on the basis of whether a time during which the output value of the first light receiving signal (or the output value of the second light receiving signal) continues at a predetermined amount or more is greater than or equal to a determination reference value adjusted by the adjustment unit after the type of smoke is identified in SA8. In these cases, for example, it is desirable to perform adjustment such that the determination reference value is raised (or lengthened) when the type of smoke is identified as artificially generated smoke in SA8, and the determination reference value is lowered (or shortened) when the type of smoke is identified as smoke at the time of flammable fire in SA8.

With Regard to Defect Detection Process

The embodiment describes that the defect detection process is executed. However, the invention is not limited thereto, and the defect detection process may be omitted. In this case, the defect determination unit 107*e* may be omitted.

One embodiment of the present invention provides a fire detection apparatus comprises: a first light emitting unit that irradiates a detection space located inside or outside the fire detection apparatus with first detection light; a second light emitting unit that irradiates the detection space with second detection light having a different wavelength from a wavelength of the first detection light; a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light; and an identification unit that identifies a type of smoke present in the detection space on the basis of an output ratio of an output value of the first light receiving signal to an output value of the second light receiving signal output from the light receiving unit and a rising rate of the output value of the first light receiving signal or the second light receiving signal.

According to this embodiment, since a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and an identification unit that identifies a type of smoke present in the detection space on the basis of an output ratio of an output value of the first light receiving signal to an output value of the second light receiving signal output from the light receiving unit and a rising rate of the output value of the first light receiving signal or the second light receiving signal are included. Thus, when compared to the conventional technology (a technology for identifying a type of smoke on the basis of only a ratio of output values of two light receiving signals), it is possible to identify the type of smoke in detail (in particular, it is possible to accurately identify smoke at the time of flammable fire and artificially generated smoke). Therefore, it is possible to accurately detect a fire based on a type of smoke, and to improve fire detection accuracy.

Another embodiment of the present invention provides the alarm apparatus according to the above embodiment, further comprising: an adjustment unit that adjusts the output value of the first light receiving signal or the output value of the second light receiving signal in accordance with the type of smoke identified by the identification unit; and a fire determination unit that determines presence or absence of the fire on the basis of the output value of the first light receiving signal or the output value of the second light receiving signal adjusted by the adjustment unit.

According to this embodiment, since an adjustment unit that adjusts the output value of the first light receiving signal or the output value of the second light receiving signal in accordance with the type of smoke identified by the identification unit; and a fire determination unit that determines presence or absence of the fire on the basis of the output value of the first light receiving signal or the output value of the second light receiving signal adjusted by the adjustment unit are included, it is possible to determine the presence or absence of a fire on the basis of the output value of the first light receiving signal or the output value of the second light receiving signal adjusted by the adjustment unit, and to more accurately perform fire detection based on the type of smoke.

Another embodiment of the present invention provides the alarm apparatus according to the above embodiment, further comprising: a fire determination unit that determines presence or absence of the fire; and an adjustment unit that adjusts a determination reference value used for determination by the fire determination unit in accordance with the type of smoke identified by the identification unit, wherein the fire determination unit determines the presence or absence of the fire on the basis of the determination reference value adjusted by the adjustment unit.

According to this embodiment, since the fire determination unit determines the presence or absence of the fire on the basis of the determination reference value adjusted by the adjustment unit, it is possible to determine the presence or absence of the fire on the basis of the determination reference value adjusted by the adjustment unit, and to more accurately perform fire detection based on the type of smoke.

Another embodiment of the present invention provides the alarm apparatus according to the above embodiment, further comprising a recording control unit that stores a determination result of the fire determination unit in storage means of the fire detection apparatus as history information.

According to this embodiment, since a recording control unit that stores a determination result of the fire determination unit in storage means of the fire detection apparatus as history information is included, it is possible to record the determination result of the fire determination unit as history information. For example, the user can detect details of an incorrect report.

Another embodiment of the present invention provides the alarm apparatus according to the above embodiment, wherein the type of smoke includes smoke at a time of flammable fire, smoke at a time of firewood fire, artificially generated smoke, and steam.

According to this embodiment, since the type of smoke includes smoke at a time of flammable fire, smoke at a time of firewood fire, artificially generated smoke, and steam, it is possible to identify the type of smoke as smoke at the time of flammable fire, smoke at the time of firewood fire, artificially generated smoke, and steam, and to identify the type of smoke in more detail.

Another embodiment of the present invention provides the alarm apparatus according to the above embodiment, further comprising: a defect determination unit that determines presence or absence of a defect of the first light emitting unit or the second light emitting unit; and a reporting unit that reports a determination result by the defect determination unit.

According to this embodiment, since a defect determination unit that determines presence or absence of a defect of the first light emitting unit or the second light emitting unit, and a reporting unit that reports a determination result by the defect determination unit are included, it is possible to report the determination result by the defect determination unit, and the user can take measures against the defect of the light emitting unit.

REFERENCE SIGNS LIST

1 Fire detection apparatus
2 Installation surface
10 Attachment base
20 Outer cover
21 Outer cover body
22 Top surface portion
22a Display hole
23 First rib portion
24 Second rib portion
30 Inner cover
30a First opening
40 Inflow space
50 Insect screen
60 Detection space
70 Detector cover
70a Second opening
80 Detector body
90 Terminal board
91 Attachment member
100 Substrate
101 First light emitting unit
102 Second light emitting unit
103 Light receiving unit
104 Display unit
104a Light guide 105 Communication unit
106 Power supply unit
107 Control unit
107a Identification unit
107b Adjustment unit
107c Fire determination unit
107d Recording control unit
107e Defect determination unit
107f Reporting unit
108 Storage unit

The invention claimed is:

1. A fire detection apparatus for detecting and reporting a fire in a monitored area, the fire detection apparatus comprising:
a substrate including,
a first light emitting unit configured to irradiate a detection space located inside or outside the fire detection apparatus with a first detection light, the first light emitting unit having at least one light emitting element that is a light emitting diode;
a second light emitting unit configured to irradiate the detection space with a second detection light having a different wavelength from a wavelength of the first detection light, the second light emitting unit having at least one light emitting element that is a light emitting diode;
a light receiving unit configured to receive scattered light of the first detection light irradiated from the first light emitting unit due to smoke, to output a first light receiving signal according to the received scattered light, to receive scattered light of the second detection light irradiated from the second light emitting unit with respect to smoke, and to output a second light receiving signal according to the received scattered light, the light receiving unit having at least one light receiving element that is a photodiode;
a memory storing program instructions, and
a processor,
wherein the program instructions are executable by the processor to configure an identification unit that is configured to identify a type of smoke present in the detection space,
wherein the type of smoke is set for each of a plurality of ranges identified by a correspondence between a first large/small relationship and a second large/small relationship,
the first large/small relationship is a relationship between an output ratio of an output value of the first light-receiving signal to an output value of the second light-receiving signal output from the light receiving unit and a plurality of first threshold values,
the second large/small relationship is a relationship between a rising rate of the output value of the first light-receiving signal or the second light-receiving signal and a plurality of second threshold values which are different from the plurality of first threshold values,
the identification unit is configured to identify 1) the first large/small relationship between the output ratio and the plurality of the first threshold values, 2) the second large/small relationship between the rising rate and the plurality of the second threshold values, 3) a range of the plurality of ranges based on the correspondence between the identified first large/small relationship and the identified second large/small relationship, and 4) the type of smoke corresponding to the identified range of the plurality of ranges, and
wherein the rising rate is either one of
(an output value of most recently acquired first light receiving signal)/(output value of first light receiving signal acquired first)−1, or
(an output value of most recently acquired second light receiving signal)/(output value of second light receiving signal acquired first)−1.

2. The fire detection apparatus according to claim 1,
wherein the program instructions are executable by the processor to further configure an adjustment unit and a fire determination unit,
the adjustment unit is a subprocessor that is configured to adjust the output value of the first light receiving signal or the output value of the second light receiving signal in accordance with the type of smoke identified by the identification unit; and
the fire determination unit is a subprocessor that is configured to determine a presence or absence of the fire on the basis of the output value of the first light receiving signal or the output value of the second light receiving signal adjusted by the adjustment unit.

3. The fire detection apparatus according to claim 1,
wherein the program instructions are executable by the processor to further configure a fire determination unit and an adjustment unit,
the fire determination unit is a subprocessor that is configured to determine a presence or absence of the fire; and
the adjustment unit is a subprocessor that is configured to adjust a determination reference value used for determination by the fire determination unit in accordance with the type of smoke identified by the identification unit,
wherein the fire determination unit is configured to determine the presence or absence of the fire on the basis of the determination reference value adjusted by the adjustment unit.

4. The fire detection apparatus according to claim 2,
wherein the program instructions are executable by the processor to further configure a recording control unit that is a subprocessor that is configured to store a determination result of the fire determination unit in a storage means of the fire detection apparatus as history information.

5. The fire detection apparatus according to claim 1, wherein the type of smoke includes smoke at a time of flammable fire, smoke at a time of firewood fire, artificially generated smoke, and steam.

6. The fire detection apparatus according to claim 1,
wherein the program instructions are executable by the processor to further configure a defect determination unit and a reporting unit,
the defect determination unit is a subprocessor that is configured to determine a presence or absence of a defect of the first light emitting unit or the second light emitting unit; and
the reporting unit is a subprocessor that is configured to report a determination result by the defect determination unit.

7. A method of detecting fire using the fire detection apparatus according to claim 1.

* * * * *